Oct. 20, 1931.                L. P. CROSMAN                 1,828,176
                         SPRING TESTING MACHINE
                        Filed Nov. 19, 1929      4 Sheets-Sheet 1

INVENTOR.
Loring P. Crosman
BY H. A. Sparks
his ATTORNEY.

Oct. 20, 1931.  L. P. CROSMAN  1,828,176
SPRING TESTING MACHINE
Filed Nov. 19, 1929  4 Sheets-Sheet 2

INVENTOR.
Loring P. Crosman
BY H. A. Sparks
his ATTORNEY

Oct. 20, 1931.  L. P. CROSMAN  1,828,176
SPRING TESTING MACHINE
Filed Nov. 19, 1929  4 Sheets-Sheet 4

INVENTOR.
Loring P. Crosman
BY
W. A. Sparks
his ATTORNEY.

Patented Oct. 20, 1931

1,828,176

UNITED STATES PATENT OFFICE

LORING P. CROSMAN, OF MAPLEWOOD, NEW JERSEY, ASSIGNOR TO MONROE CALCULATING MACHINE COMPANY, OF ORANGE, NEW JERSEY, A CORPORATION OF DELAWARE

SPRING TESTING MACHINE

Application filed November 19, 1929. Serial No. 408,238.

This invention relates to machines for testing the tension of springs and is in many respects a continuation of my application Ser. No. 256,272, filed February 23, 1928.

One of the principal objects of the invention is to provide novel means for gripping a spring to be tested.

Another object of the invention is to produce a spring testing arm whereby the spring to be tested is forced into intimate engagement with the shoulder of the supporting mandrel during the movement of the spring to testing position, whereby every spring tested is opened by the holding means at substantially the same distance from its ends.

Another object of the invention is to produce a device whereby it shall be insured that both knives of the spring tension arm shall enter between the coils of every spring tested.

Other objects will appear as the specification proceeds. All of these objects are accomplished by mechanism illustrated in the accompanying drawings, in which:

Fig. 10 is a perspective view of the reject-chute and spring-guide.

Like characters of reference refer to like parts in all views.

Figure 1:
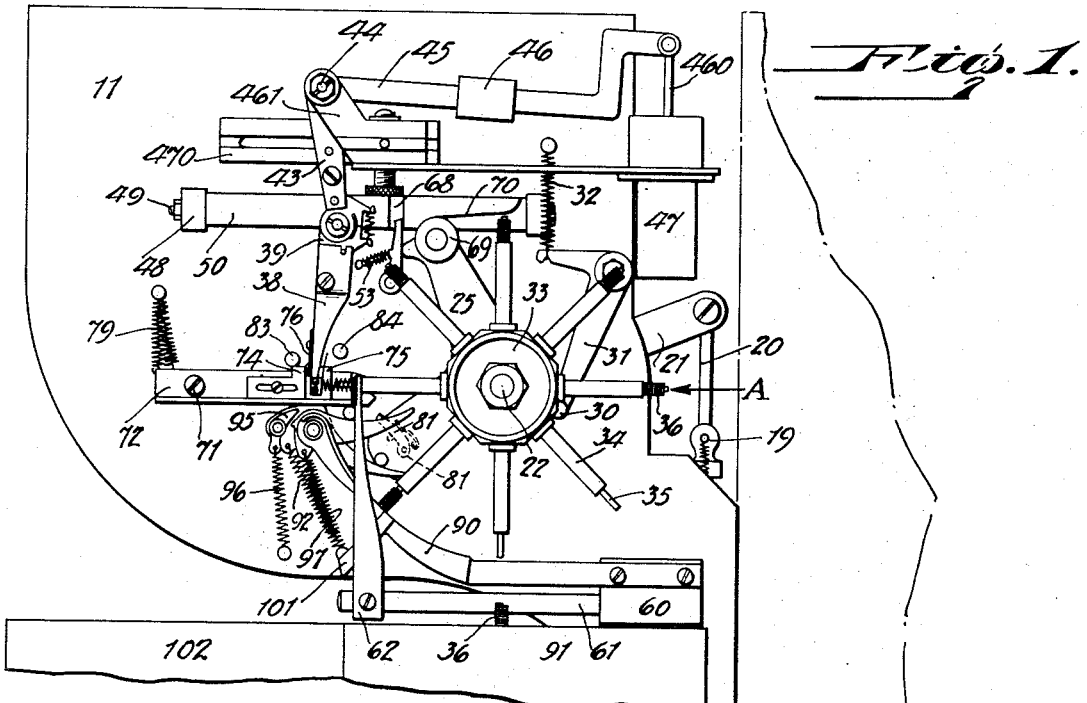
Fig. 1 is a side elevation of a spring testing device incorporating my invention and showing the parts in spring testing position.
Figure 3:
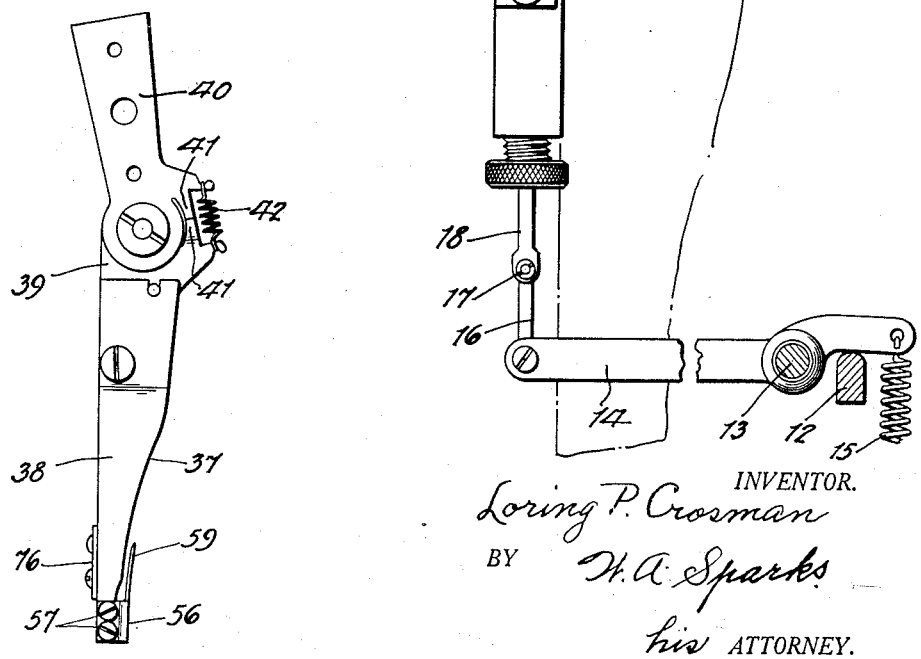
Fig. 3 is a side elevation of the spring testing arm per se.

Referring to the drawings in detail, 10 represents the framework of a spring making machine and 11 the supporting plate or frame upon which the mechanism of the spring testing machine is mounted. 12 represents a portion of the spring making machine which is reciprocated vertically at desired intervals, and is utilized to operate the spring testing device as will presently appear.

Figures 8, 14:
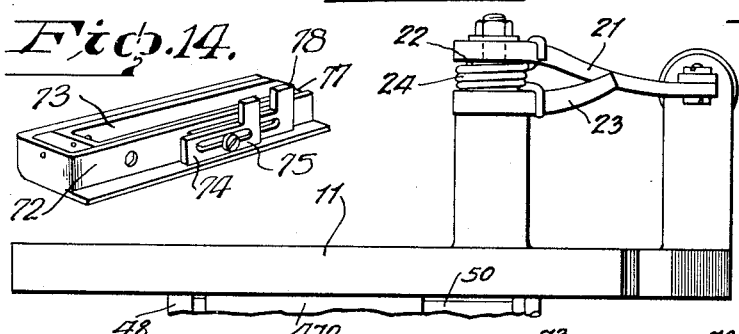
Fig. 8 is a top plan view of the supporting frame and the parts extending rearwardly therefrom.
Fig. 14 is a perspective view of two U-shaped members of the machine.

Mounted on the stud 13 secured to the framework 10 or other suitable stationary member is a rock lever 14 having one arm resting upon the reciprocatory member 12 and pressed thereagainst by a spring 15. The other arm of lever 14 is connected by a link 16 and universal joint 17 to a reciprocatory rod 18 supported by suitable bearings and connected by a universal joint 19 and link 20 to an arm 21 rotatably supported on the main shaft 22 of the spring testing device. Secured to the main shaft 22 is an arm 23 the free end of which is normally pressed into contact with arm 21 by a spring 24 (see Fig. 8).

When member 12 moves upwardly it effects rocking of the lever 14 against the tension of spring 15 and draws down on rod 18 thereby rocking arm 21. The spring 24 causes arm 23 to follow arm 21 during this movement. As the member 12 moves downwardly spring 15 rocks the lever 14 thereby raising the rod 18, and arm 21 forces the arm 23 upwardly. Thus the main shaft 22 is oscillated at each reciprocatory movement of the member 12.

The shaft 22 is mounted in suitable bearings in the plate 11 and carries at the front of said plate 11 a bell-crank lever 25 secured thereto for rotation therewith. Pivotally mounted on the bell-crank 25 is a spring pressed ratchet pawl 26 which is adapted to engage the teeth of a ratchet wheel 27 loosely mounted on the shaft 22. A detent wheel 28 is secured to the ratchet wheel 27 for rotation therewith and is formed with notches 29 which are adapted to be engaged by a detent pin 30 carried by one arm of a bell-crank 31. The pin 30 is held constantly in engagement with the periphery of the detent disk 28 by a suitable spring 32. Secured to the ratchet wheel 27 and to detent wheel 28 is a turret 33 (see Fig. 1), which carries a plurality of mandrels or spring supporting rods 34. Each of the mandrels or rods 34 has a reduced end portion 35 upon which springs 36 are fed either automatically or by hand at the position indicated in Fig. 1 by the reference character A.

The construction and proportion of the several parts thus far described is such as to rotate the turret 33 sufficiently at each reciprocation of member 12 to cause the following mandrel 34 to be moved to spring receiving position. In the machine as illustrated there are eight mandrels, and, therefore, each reciprocation of member 12 effects a turning of the turret thru an arc of 45 degrees.

Figure 2:
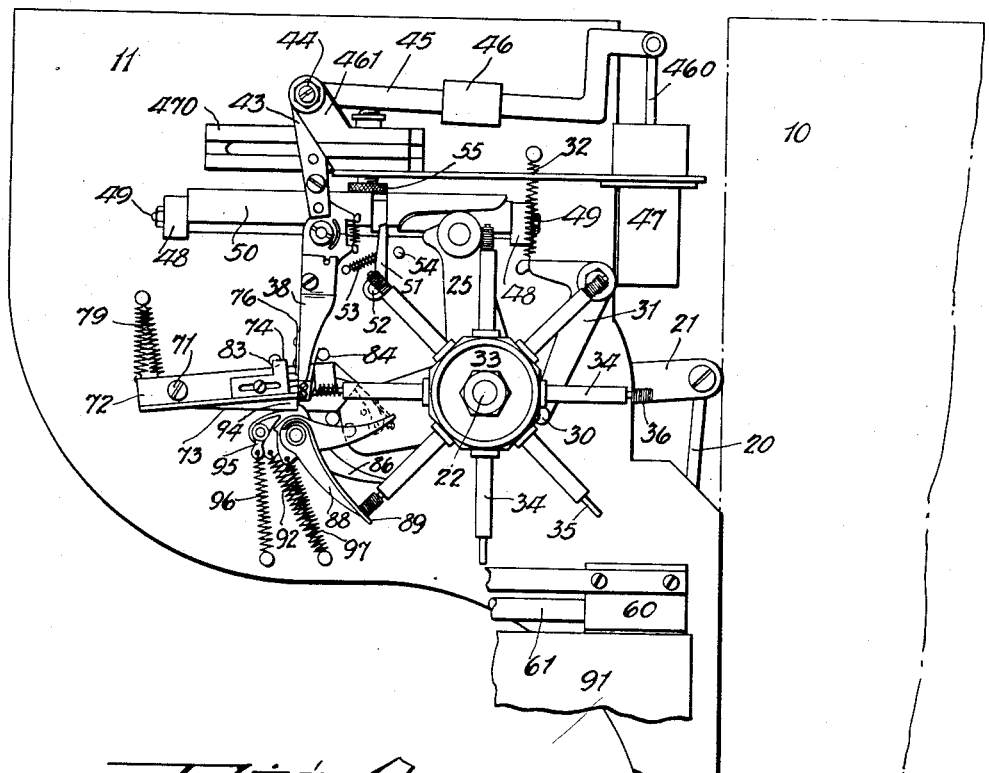
Fig. 2 is a similar view with parts broken away and with the mechanism shown in the position assumed just after testing a good spring.
Figure 6:
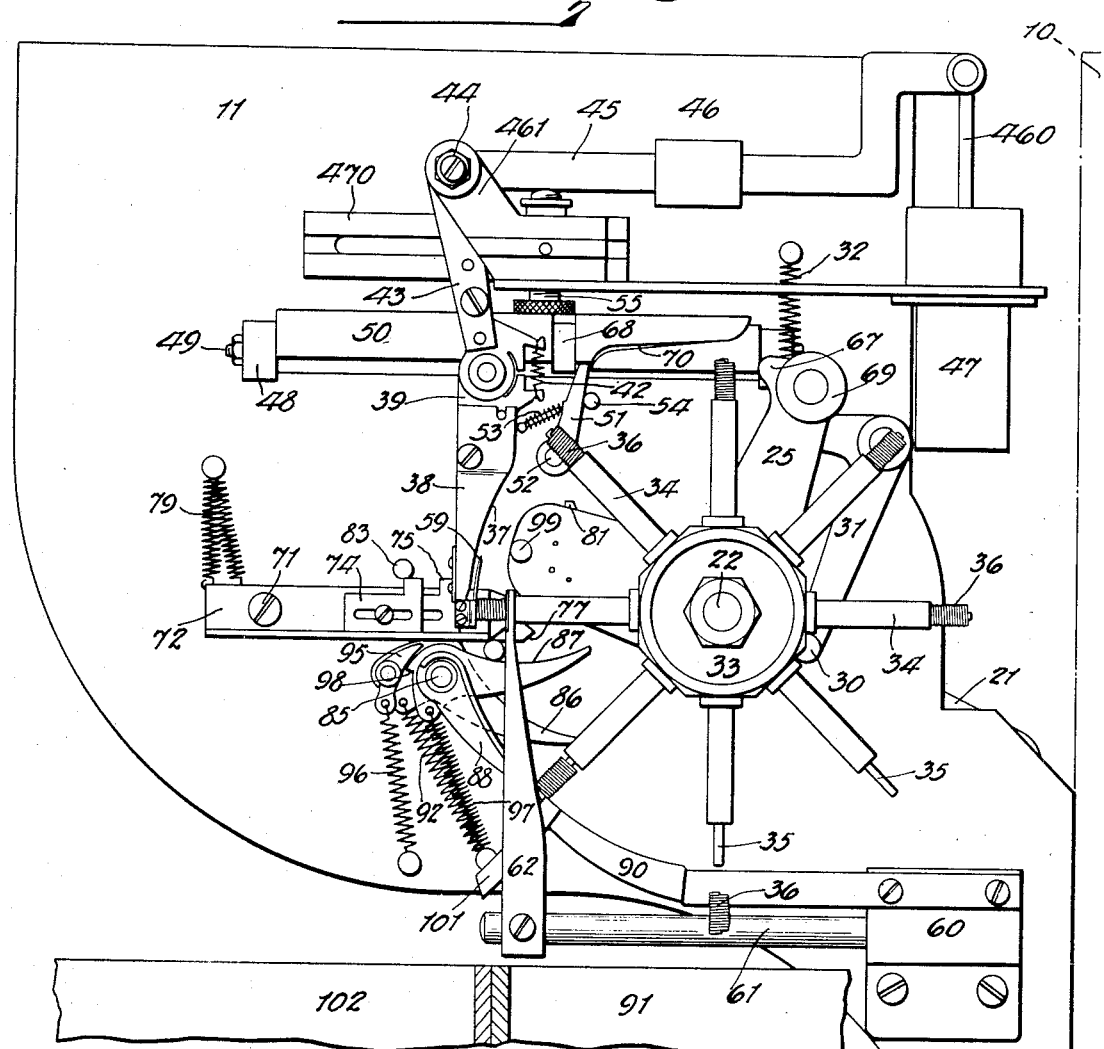
Fig. 6 is an enlarged view of certain of the parts shown in Fig. 1.
Figure 7:
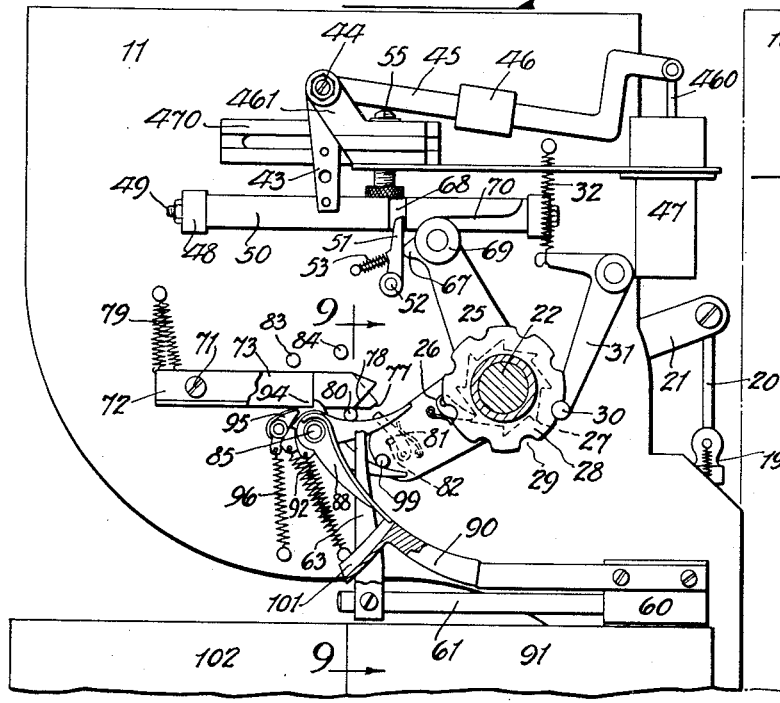
Fig. 7 is a view similar to Fig. 1 with parts removed and broken away for the sake of clearness.
Figure 9:
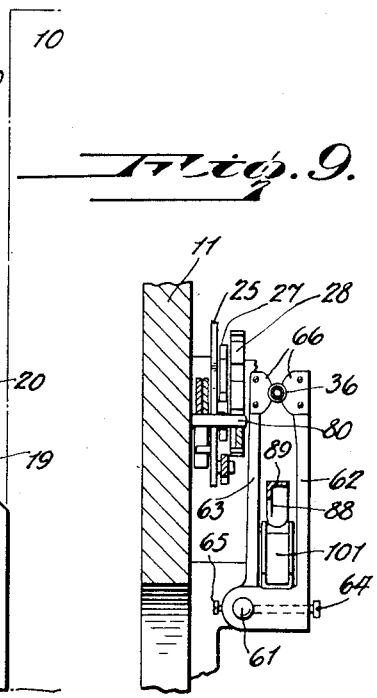
Fig. 9 is a vertical section taken substantially on line 9—9 of Fig. 7.

We shall now consider the spring testing device. The springs after they have been placed on the mandrels 34 are carried in a counter-clockwise direction as seen in Figs. 1, 2 and 6 until they have reached a position diametrically opposite the position A. When they have reached this position they have been fed into the spring testing device. This device consists of means for gripping each end of the spring and then exerting tension on the spring for testing purposes. As the mandrel holding the spring to be tested makes its last step of movement to spring-testing position, the end of the reduced portion carrying such spring enters between the sides 37 of a channel shaped spring-testing member 38, rigidly secured to an arm 39. Arm 39 is pivotally connected to an arm 40, and stop members 41 of the arms 39 and 40 are drawn into engagement with each other by a spring 42. The arm 40 is rigidly secured to a depending arm 43 of a bell-crank lever, pivoted at 44 and having a horizontal arm 45 upon which a weight 46 is adjustably mounted. The end of arm 45 carries a plunger 460 which works in a dash pot 47. Pivot 44 is carried by a supporting member 461 adjustably supported in a slotted member 470 carried by the frame 11.

Figures 4, 5:
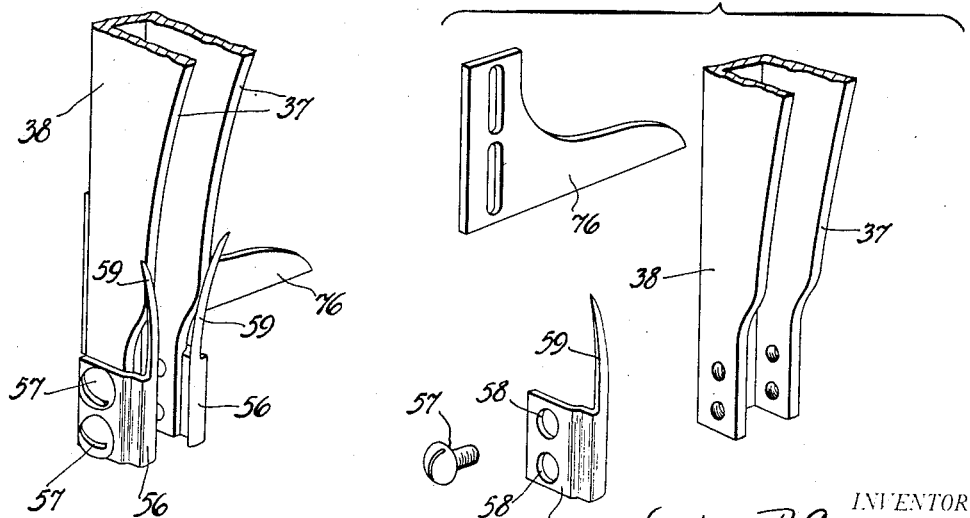
Fig. 4 is a fragmentary perspective view of the end of the spring testing arm per se.
Fig 5 is a view showing a fragment of the spring testing arm and certain of the parts associated therewith.

Mounted in bearings 48 are pintels 49 extending from and forming the pivots of a plate 50. The plate 50 is normally supported by a pawl 51 which is urged in a clockwise direction around its pivot 52 by a spring 53. Pivot 52 is secured to the plate 11 as is also a stop pin 54 for limiting the clockwise movement of pawl 51. Spring 53 is of the expansion type. In its uppermost position, plate 50 moves upwardly against an adjustable pin 55 the upper end of which moves arm 45 upwardly so as to swing the spring testing member 38 towards the mandrels. The pressure of the edges 37 against the spring 36 as it comes into contact with the edges 37 forces the spring into intimate contact with the shoulder at the juncture of element 35 with the main portion of the mandrel 34. The spring 42 permits adjustment of the arms 39 and 40 so as to take care of any slight differences in the length of the springs. The member 38 carries a pair of spring gripping knives 56 which are secured to it by screws 57, the diameter of the shanks of screws 57 being slightly less than the apertures 58 provided for their passage (see Figs. 4 and 5). This provides a limited amount of adjustment for the knives 56 so as to compensate for slight differences in the stock used in making the springs tested.

Each of the knives 56 is extended upwardly into a springy engagement blade 59, the two blades 59 being adapted to enter between the coils of the spring 36 as it is pressed downwardly and to guide the same into the reinforced portion of plates 56.

It will be noted that when the end of element 35 extends into the channel between elements 37 the spring is forced to engage with both of the plates 59 as it is pressed downwardly. It will also be noted that the pressure of arm 38 against the spring to be tested insures the plates entering at substantially the same distance from the end of each spring tested. Furthermore, it will be noted that members 56 are bent inwardly about the edges 37 so as to contact opposite sides of the spring and prevent the same from slipping off either knife during the testing moment.

A block 60 is secured to the front face of the plate 11 and carries a rod or bar 61 which extends toward the left and carries two upright arms 62 and 63. The members 62 and 63 may be adjusted longitudinally of the bar 61 and are secured thereto in any desired position by set screws 64 and 65, respectively. The members 62 and 63 are so adjusted on the bar 61 that blades 66 carried by members 62 and 63 will enter between the desired coils of the spring to be tested. It will be noted that the pressing of the spring 36 against the shoulder at the base of the element 35 insures that each spring tested will be engaged by the blades 66 at substantially the same distance from the end of the springs. While the arms 62 and 63 are relatively rigid, they are sufficiently springy to permit the plates 66 to move slightly in one direction or the other so as to engage between the coils of the spring. When the spring 36 has been engaged at one end by the members 56 and the other by the members 66, the plate 50 is permitted to drop, thereby allowing the weight 46 to effect clockwise movement of the rock lever 43—45 and of the spring testing member 38. The plate 50 is permitted to drop by reason of the bell-crank lever 25 having moved counter-clockwise until a lug 67 has engaged the pawl 51 and moved it to the position shown in Fig. 1 wherein said pawl is shown as registering with an aperture 68 formed in the plate 50. After the spring has been tested the bell-crank 25 is moved clockwise and a roller 69 carried thereby rides against a cam surface 70 formed on the plate 50, lifting the latter until the pawl 51 is again forced clockwise by its spring 53.

Pivoted on a pin 71 supported by the plate 11 are an outer U-shaped member 72 and an inner U-shaped member 73. The outer U-shaped member 72 carries a pair of adjustable limit stops 74 and 75 which are adjustable so as to indicate by their distance apart the limits of tolerance permitted to the springs being tested. A finger 76 secured to the member 38 (see Figs. 4 and 5) is adapted to come to rest between the stops 74 and 75 when the spring is within the required tolerance. If the spring is too strong the finger 76 will come to rest over the stop 75 and if it is too weak the finger 76 will come to rest over the stop 74.

One arm of the outer U-shaped member 72 is formed with an inclined abutment 77, and one end of the inner U-shaped member 73 is formed with an inclined abutment 78. Both U-shaped members are constantly urged by springs 79 in a clockwise direction and normally rest upon a stationary stop pin 80 fast to the plate 11. A pawl 81 pivoted on bell-crank 25 and spring pressed against a pin 82 is positioned, when the bell-crank 25 is in the position shown in Fig. 1, under the abutment 77 of the rocking frame 72, and if the spring tested is a good one, so that finger 76 stands between the stops 74 and 75, then upon clockwise rotation of the lever 25, pawl 81 will engage the abutment 77 and will rock the frame 72 until the abutment 77 stands in alignment with the abutment 78 at which time the frame 72 will be stopped by a pin 83 and the pawl 81 will cam off from the abutment 77 without having affected abutment 78 or its rocking frame 73.

If, however, the spring 36 which is being tested exceeds the permitted tolerance in either direction, then finger 76 will stand over one or the other of the stops 74 or 75 and hold the rocking frame 72 against movement. Now, when bell-crank 25 rocks clockwise, pawl 81 cams off the abutment 77 and engages abutment 78, rocking frame 73 against a stop pin 84 and setting the reject mechanism now to be described.

Mounted on a pivot pin 85 secured to the plate 11 are three fingers 86, 87 and 88. Finger 88 carries a gate 89 in the form of an arcuate track or guide, which when in its normal position, prevents the springs 36 from falling off the mandrels until they have passed from testing position to a guide 90 (Figs. 6 and 10), which in turn prevents falling of the springs until they are over a receptacle 91, Fig. 1, provided to receive good springs. This finger 88 is rigidly secured to and rotates with the reject finger 87.

The finger 86 is what may be termed a reject-setting finger, as it prepares the means for rejecting a bad spring. Finger 86 is constantly urged in a counter-clockwise direction by a spring 92, and is provided with a detent shoulder 93 which is normally engaged by a finger 94 of the rocking frame 73. The finger 86 also extends to the left of its pivot and carries a pawl 95 constantly under tension of a spring 96.

The reject finger 87 is constantly urged in a counter-clockwise direction by a spring 97, and is formed with a shoulder 98. Counter-clockwise rotation of fingers 86 and 87 is limited by the pin 80.

Figure 13:
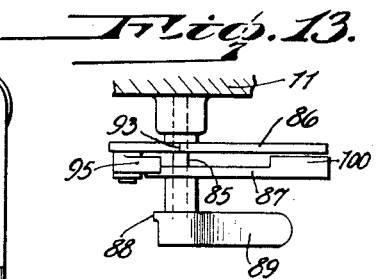
Fig. 13 is a top plan view of the gate-controlling fingers.
Figure 11:
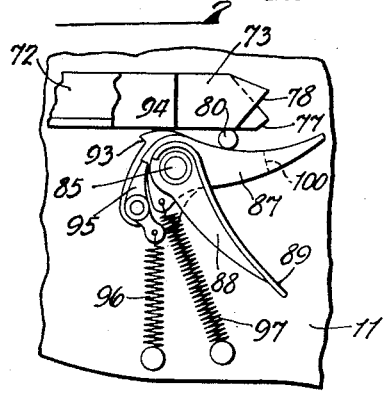
Fig. 11 is a fragmentary detail view of the controlling means for the reject-gate showing the position of the parts when it has been determined that the spring being tested should be rejected.
Figure 12:
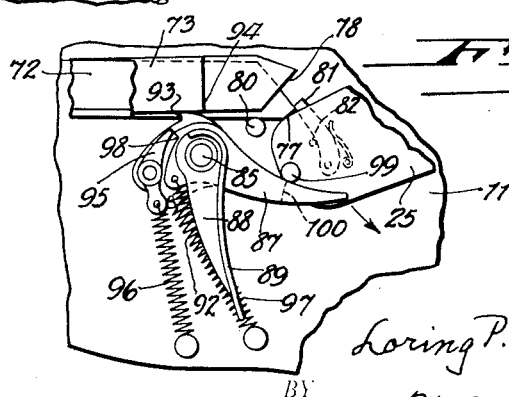
Fig. 12 is a similar view showing the position of the parts when the operating pawl for the reject-gate has moved out of active position.

When a bad spring is tested, and the frame 73 is rocked, finger 94 is withdrawn from stop shoulder 93, and finger 86 moves counter-clockwise under impulse of its spring 92 until pawl 95 is below shoulder 98. On account of the changed relation of pawl 95 and the anchor of spring 96, this spring now causes pawl 95 to engage under shoulder 98. Upon the ensuing operation of bell-crank 25, a pin 99 mounted on lever 25 is brought down on finger 86 returning it to normal. During this movement the pawl 95 carries finger 87 with it, but disengages before it reaches normal; and, if means were not provided to prevent such an occurrence, the finger 87 would snap back to normal. However, as shown in Fig. 13, the finger 87 is formed with a thickened portion 100; and pin 99 which is short enough to escape the thin portion of lever 87 during normal operations, is long enough to engage the portion 100 which moves under pin 99 prior to disengagement of pawl 95 from shoulder 98. The pin 99 therefore forces complete depression of finger 87, which rocks finger 88 and its gate 89 so as to release the bad spring 36 into a reject chute 101 from which it is ejected into a receptacle 102.

The elements 90 and 101 are formed from a single strip of metal which is secured to block 60.

While I have described what I consider to be the most desirable embodiment of my invention for the purpose set forth, it is obvious that changes in form could be made without departing from the spirit of my invention and I, therefore, do not limit myself to the exact details herein shown and described, or to anything less than the whole of my invention as hereinafter particularly pointed out in the claims.

I claim:

1. A spring testing device including a member formed with a channel, a pair of spring engaging members secured thereto and each formed with a flexible spring-entering portion and a rigid testing portion.

2. A spring testing device including a rotatable member, a plurality of spring carriers on said member and each adapted to receive a spring to be tested, means for operating said member to bring one after another of said spring carriers into testing position, a testing member formed with a channel and arranged to receive the ends of said spring carriers when the latter are in testing position, means for normally pressing said testing member against opposite sides of the end of a spring to be tested, and means for moving said testing member to effect tensioning of a spring to be tested.

3. A spring testing device including a rotatable member, a plurality of spring carriers on said member and each adapted to receive a spring to be tested, means for operating said member to bring one after another of said spring carriers into testing position, a testing member formed with a channel and arranged to receive the ends of said spring carriers when the latter are in testing position, means for normally pressing said testing member against opposite sides of the end of a spring to be tested, means mounted on said testing member for engaging one end of the spring to be tested, means for engaging the other end of the spring to be tested, and means for moving said arm to effect tensioning of a spring to be tested.

4. A spring testing device including a rotatable member, a plurality of spring carriers on said member and each adapted to receive a spring to be tested, means for operating said member to bring one after another of said spring carriers into testing position, a testing member formed with a channel and arranged to receive the ends of said spring carriers when the latter are in testing position, means for normally pressing said testing member against opposite sides of the end of a spring to be tested, means mounted on said testing member for engaging one end of the spring to be tested, means for engaging the other end of the spring to be tested, and actuating means for said member and connected thereto in such manner as to positively move said testing member in one direction and yieldingly move said testing member in the opposite direction.

5. The combination of a member for supporting a spring to be tested and formed with a shoulder, means for pressing a spring to be tested against said shoulder, adjustable means for engaging said spring, means for causing the first said means to exert testing tension on said spring when engaged by said adjustable means, and means controllable by the first said means for ejecting the spring tested at either of two positions.

6. A spring testing device including a rotatable member, a plurality of spring carriers on said member and each adapted to receive a spring to be tested, means for operating said member to bring one after another of said spring carriers into testing position, a testing member formed with a channel and arranged to receive the ends of said spring carriers when the latter are in testing position, members mounted on said testing member and formed with spring-entering blades and with portions adjacent to said channel for preventing lateral slipping of a spring to be tested, and means for moving said arm to effect tensioning of a spring to be tested.

7. A spring testing member comprising a channel-shaped arm and a pair of plates fastened to said arm and formed with spring-engaging knife elements and with spring-holding elements between said knife elements and the edges of the channel.

8. A spring testing device including a rotatable member, a plurality of spring carriers on said member and each adapted to receive a spring to be tested, means for operating said member to bring one after another of said spring carriers into testing position, a testing member formed with a channel and arranged to receive the ends of said spring carriers when the latter are in testing position, means for normally pressing said testing member against opposite sides of the end of a spring to be tested, means mounted on said testing member and including elements for entering the coils of a spring to be tested and elements for preventing lateral movement of one end of a spring to be tested, means for engaging the other end of the spring to be tested, and means for moving said arm to effect tensioning of a spring to be tested.

Signed at Orange, in the county of Essex and State of New Jersey, this 6th day of November, A. D. 1929.

LORING P. CROSMAN.